INVENTOR.
BASTIAAN VAN DER VOO
BY
AGENT

United States Patent Office 3,531,859

Patented Oct. 6, 1970

3,531,859

METHOD FOR ACCURATELY DETERMINING GAP HEIGHTS OF POLE PIECES FOR MAGNETIC HEADS

Bastiaan van der Voo, Emmasingel, Eindhoven, Netherlands, assignor, by mesne assignments, to U.S. Philips Corporation, New York, N.Y., a corporation of Delaware Application May 17, 1967, Ser. No. 639,249, now Patent No. 3,435,155, dated Mar. 25, 1969, which is a continuation of application Ser. No. 348,335, Mar. 2, 1964. Divided and this application Aug. 16, 1968, Ser. No. 753,139

Claims priority, application Netherlands, Mar. 1, 1963, 289,675

Int. Cl. H01f *7/06*

U.S. Cl. 29—603 1 Claim

ABSTRACT OF THE DISCLOSURE

A method of accurately determining gap heights in a magnetic head providing an additional surface in a gap face after polishing and grinding. The additional face provides an accurate reference line for grinding the head surface to a desired height in that the straight edged boundary of the additional face replaces the relatively inaccurate gap face edge which is the result of the grinding and polishing step.

This application is a division of application Ser. No. 639,249, filed May 17, 1967, which is a continuation of application Ser. No. 348,335, filed March 2, 1964, by Bastiaan Van Der Voo.

This invention relates to a method of manufacturing pole pieces for a magnetic head intended for recording, reproducing and/or erasing magnetic recordings more particularly the invention relates to a method of manufacturing such a pole piece for a head having a gap height which must lie within very narrow limits.

The invention is specifically adaptable for pole pieces made of sintered oxidic ferromagnetic material or ferrite. In manufacturing such a pole piece it is the usual practice to gring and to polish to a high degree a surface of the pole piece which becomes a boundary face of the useful gap after assembly in the completed head. It has been found in practice that difficulties arise in determining the correct gap height after the complete head is assembled. The lower boundary line of the polished face located on the inner side of the pole piece must be used. As a reference line after assembling for correct determination of the gap height; the correct gap height, which is often, for example, only 100 microns with a minimum tolerance, is then determined by grinding away the front face, i.e., the face adjacent the record carrier. However, said lower boundary line, which is adjusted microscopically, is found to be no longer accurately perceptible after the polishing operation.

According to the invention, after the polishing operation, the intersecting line between the polished boundary face and the inner face of the pole piece is ground away so as to obtain an additional face which is at an obtuse angle to the boundary face of the gap. It has been found that the separating line between this additional face and the gap boundary face is completely sharp so that this line can now be used as a reference line for the accurate determination of a gap height.

The invention also relates to a pole piece manufactured by the method above described.

In order that the invention may be readily carried into effect, it will now be described more fully, by way of example, with reference to the accompanying diagrammatic drawing, in which.

Figure 1:
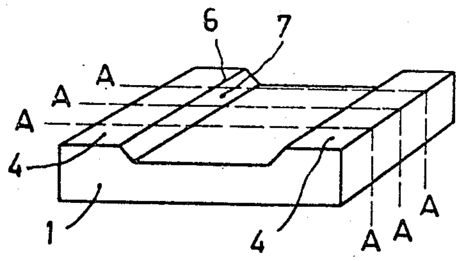
FIG. 1 shows a U-shaped body of sintered oxidic ferromagnetic material (ferrite)
Figure 2:
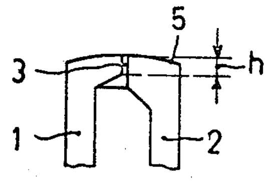
FIG. 2 is a side view of part of a magnetic head.
Figure 3:
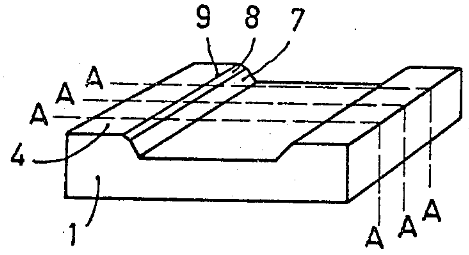
FIG. 3 shows a U-shaped body of ferrite manufactured in accordance with the invention.

Referring now to FIG. 1, the reference numeral 1 denotes a U-shaped body of sintered oxidic ferromagnetic material which is wholly ground and from which, after completion, pole pieces for magnetic heads may be manufactured by sawing the body along the broken lines A—A. As shown in FIG. 2, the parts thus obtained are secured to other similar parts 2 with the interposition of a non-magnetizable material 3 which bond the parts together, preferably glass. The faces 4 are high-gloss polished prior to the securing procedure and their flatness must be such that no deviation can be found upon measurement with a purely planoparallel glass plate. After assembly, the height of the gap must be accurately adjusted by grinding off the front face 5 and this adjustment is possibly only by microscopic measurement of the height *h*. However, it has been found that, after polishing the faces 4, the intersecting line 6 between the faces 4 and 7 can no longer be used for accurate measurement since this line has acquired an irregular form due to the polishing of the face 4. If, however, according to the invention, the line 6 is ground away, as shown in FIG. 3, so as to obtain a face 8 which is at an obtuse angle to the gap boundary face 4, the intersecting line 9 between the faces 8 and 4 is when observed found to be completely sharp again under a microscope. The line 9 may consequently serve as an accurate reference line for adjusting the height *a* of the gap. In a practical embodiment, it was found to be sufficient for the face 8 to be no wider than 0.5 mm. In this case, the surface 4 was so polished that it was optically flat.

While the invention has been described with respect to a specific embodiment, modifications thereof will be readily apparent to those skilled in the art without departing from the inventive concept, the scope of which is set forth in the appended claim.

What is claimed is:

1. A method of manufacturing a pole piece having an ascertainable reference line for determining the gap height of a ferrite magnetic head, comprising: polishing to a high degree of flatness a face surface of the leg portion of a first piece of magnetic ferrite having a body portion and a leg portion, said face surface forming a line of intersection with said leg portion, grinding away said line of intersection and a portion of said face surface and said leg portion at said line of intersection to form an additional surface extending at an obtuse angle to the face surface and two new lines of intersection, placing said face surface adjacent to the face surface of a second piece of ferrite with the interposition of a gap-filling material, thus forming a pole-piece assembly, said two face surfaces meeting at the front surface of said assembly, and grinding away said front surface using the line of intersection of the face surface and the additional surface of said first piece of ferrite as a reference line.

References Cited

UNITED STATES PATENTS 3,094,772 6/1963 Duinker ---------- 29—703
3,177,475 4/1965 Bos et al. ---------- 340—174.1

CHARLIE T. MOON, Primary Examiner

C. E. HALL, Assistant Examiner